US008586641B2

(12) United States Patent
Trojer et al.

(10) Patent No.: US 8,586,641 B2
(45) Date of Patent: Nov. 19, 2013

(54) MONOLITHIC ORGANIC COPOLYMER

(75) Inventors: Lukas Trojer, Amras (AT); Günther Bonn, Zirl (AT)

(73) Assignee: Leopold-Franzens-Universitat Innsbruck, Innsbruck (AT)

( * ) Notice: Subject to any disclaimer, the term of this patent is extended or adjusted under 35 U.S.C. 154(b) by 1403 days.

(21) Appl. No.: 11/551,181

(22) Filed: Oct. 19, 2006

(65) Prior Publication Data

US 2008/0097037 A1    Apr. 24, 2008

(51) Int. Cl.
*C08F 220/06* (2006.01)
*C08F 220/14* (2006.01)
*C08F 236/20* (2006.01)
*C08F 212/08* (2006.01)
*C08J 9/28* (2006.01)
*B01D 15/08* (2006.01)

(52) U.S. Cl.
USPC ............. 521/63; 526/210; 526/212; 526/220; 526/317.1; 526/318.6; 526/328.5; 526/329; 526/329.1; 526/329.2; 526/329.7; 526/335; 526/336; 526/340; 526/347; 526/347.1; 526/209; 210/635; 210/656; 210/198.2; 521/64; 521/142; 521/146; 521/150

(58) Field of Classification Search
USPC ........... 526/209, 210, 212, 220, 317.1, 318.6, 526/328.5, 329, 329.1, 329.2, 329.7, 335, 526/336, 340, 347, 347.1; 210/635, 656, 210/198.2; 521/63, 64, 142, 146, 150
See application file for complete search history.

(56) References Cited

U.S. PATENT DOCUMENTS

2007/0144972 A1 *   6/2007   Bonn et al. .................... 210/656

FOREIGN PATENT DOCUMENTS

WO       WO 02/40130 A1 *   5/2002

OTHER PUBLICATIONS

Premstaller et al., Anal. Chem. 72 (2000) 4386-4393.*
E. C. Peters, & C. Ericson; Monolithic Stationary Phases for the Separation of Small Molecules; Journal of Chromatography Library; 2003; pp. 373-287; vol. 67; Elsevier Sciences B.V.
Wikipedia, "Small molecule", from Wikipedia, the free encyclopedia (Redirected from Small molecules). http://en.wikipedia.org/wiki/Small_molecules, Feb. 2010.
Bencina, M et al., Characterization of methacrylate monoliths for purification of DNA molecules, J. Sep. Sci. , 2004, pp. 801-810, vol. 27, WILEY-VCH Verlag GmbH & Co. KGaA, Weinheim.
Cabrera, K., Applications of silica-based monolithic HPLC columns, J. Sep. Sci., 2004, pp. 843- 852, vol. 27, WILEY-VCH Verlag GmbH & Co. KGaA, Weinheim.
Fields, Steven M., Silica Xerogel as a Continuous Column Support for High-Performance Liquid Chromatography, Analytical Chemistry, Aug. 1, 1996, pp. 2709-2712, vol. 68, No. 15, American Chemical Society.
Gusev, I. et al., Capillary columns with in situ formed porous monolithic packing for micro high-performance liquid chromatography and capillary electrochromatography, Journal of Chromatography A, 1999, pp. 273-290, vol. 855, Elsevier.
Hjerten, S., et al. High-performance liquid chromatography on continuous polymer beds, Journal of Chromatography, 1989, pp. 273-275, vol. 473, Elsevier Science Publishers B.V., Amsterdam—Printed in the Netherlands.
Hjerten, Stellan, Standard and Capillary Chromatography, Including Electrochromatography, on Continuous Polymer Beds (Monoliths), Based on Water-Soluble Monomers, Ind. Eng. Chem. Res., 1999, vol. 38, No. 4, American Chemical Society.
Holdsvendova, P. et al., Methacrylate monolithic columns for capillary liquid chromatography polymerized using ammonium peroxodisulfate as initiator, J. Sep. Sci., 2003, pp. 1623-1628, vol. 26, WILEY-VCH Verlag GmbH & Co. KGaA, Weinheim.
Klodzinska, E. et al., Monolithic continuous beds as a new generation of stationary phase for chromatographic and electro-driven separations., Journal of Chromatography A., 2006, pp. 51-59, vol. 1109. Elsevier B.V.
Lee, D. et al., Photopolymerized monolithic capillary columns for rapid micro high-performance liquid chromatographic separation of proteins, Journal of Chromatography A, 2004, pp. 53-60, vol. 1051, Elsevier B.V.
Minakuchi, H. et al., Octadecylsilylated Porous Silica Rods as Separation Media for Reversed-Phase Liquid Chromatography, Analytical Chemistry, Oct. 1, 1996, pp. 3498-3501, American Chemical Society.
Moravcova, D. et al., Characterization of polymer monolithic stationary phases for capillary HPLC, J. Sep. Sci., 2003, pp. 1005-1016; vol. 26, WILEY-VCH Verlag GmbH & Co. KGaA, Weinheim.

(Continued)

*Primary Examiner* — Roberto Rabago
(74) *Attorney, Agent, or Firm* — Workman Nydegger

(57) ABSTRACT

The present invention relates to a monolithic organic copolymer prepared by copolymerization of at least one monomer of the group consisting of styrene, ($C_1$-$C_3$)alkylstyrene, (meth)acrylic acid and esters thereof with a crosslinker in the presence of a macroporogen and a microporogen, wherein a) the sum of said at least one monomer of the group and the crosslinker is 10-20%, preferably 10-15%, by volume of the reaction mixture, with the rest being essentially macroporogen and microporogen, and the degree of said copolymerization is at least 70%, preferably at least 90%, more preferably at least 99%, or b) the sum of said at least one monomer of the group and the crosslinker is 30-50%, preferably 35-45%, by volume of the reaction mixture, with the rest being essentially macroporogen and microporogen, and the degree of said copolymerization is in the range of 25-60%, preferably 35-50%.

These copolymers can be used in high-performance liquid chromatography for the separation of biopolymers as well as small molecules.

9 Claims, 9 Drawing Sheets

(56) References Cited

OTHER PUBLICATIONS

Peters, E. C. & Ericson, C., Monolithic Stationary Phases for the Separation of Small Molecules, Journal of Chromatography Library, Monolithic Materials, 2003, pp. 373-387, vol. 67, Chp. 17, Elsevier Science B.V.

Peters, E.C. et al., Rigid Macroporous Polymer Monoliths, Advanced Materials, WILEY-VCH Verlag GmbH, Weinheim, 1999.

Premstaller, A. et al., High-Performance Liquid Chromatography-Electrospray Ionization Mass Spectrometry Using Monolithic Capillary Columns for Proteomic Studies, Analytical Chemistry, Jun. 1, 2001, pp. 2390-2396, vol. 73, No. 11., American Chemical Society.

Podgornik, A. et al., Convective Interaction Media (CIM)—Short layer monolithic chromatographic stationary phases, Biotechnology Annual Review, 2005, pp. 281-333, vol. 11, Elsevier B.V.

Sing, K.S.W., et al. Reporting Physisorption Data For Gas/Solid Systems with Special Reference to the Determination of Surface Area and Porosity, Pure & Appl. Chem., International Union of Pure and Applied Chemistry, Physical Chemistry Division, Commission on Colloid and Surface Chemistry Including Catalysis, 1985, pp. 603-619, vol. 57, No. 4, IUPAC, GB.

Svec, F. et al., Design of the monolithic polymers used in capillary electrochromatography columns, Journal of Chromatography A, 2000, pp. 3-29, vol. 887, Elsevier.

Svec, F. et al., MonoLithic Materials Promises, Challenges, Achievements, Analytical Chemistry, Apr. 1, 2006, pp. 2100-2107, American Chemical Society.

Svec, Frantisek, Organic polymer monoliths as stationary phases for capillary HPLC, J. Sep. Sci., 2004, pp. 1419-1430; vol. 27, WILEY-VCH Verlag GmbH & Co. KGaA, Weinheim.

Svec, Frantisek, Preparation and HPLC applications of rigid macroporous organic polymer monoliths, J. Sep. Sci. 2004, pp. 747-766, vol. 27, WILEY-VCH Verlag GmbH & Co. KGaA, Weinheim.

Svec, F. et al., Temperature, a Simple and Efficient Tool for the Control of Pore Size Distribution in Macroporous Polymers, Macromolecules, 1995, pp. 7580-7582, vol. 28, American Chemical Society.

Sykora, David, et al., Separation of oligonucleotides on novel monolithic columns with ion-exchange functional surfaces, Journal of Chromatography, 1999, pp. 297-304, vol. 852, Elsevier Science B.V.

Tanaka, N., et al., Monolithic silica columns for high-efficiency chromatographic separations, Journal of Chromatography, 2002, pp. 35-49, vol. 965, Elsevier Science B.V.

Trojer, L. et al., High capacity organic monoliths for the simultaneous application to biopolymer chromatography and the separation of small molecules, Journal of Chromatography A, 2009, pp. 6303-6309, vol. 1216, Elsevier B.V.

Trojer, L. et al., Monolithic poly($p$-methylstyrene-co-1,2-bis($p$-vinylphenyl)ethane) capillary columns as novel styrene stationary phases for biopolymer separation, Journal of Chromatography A, 2006, pp. 56-66, vol. 1117. Elsevier B.V.

Viklund, C. et al. Monolithic, "Molded", Porous Materials with High Flow Characteristics for Separations, Catalysis, or Solid-Phase Chemistry: Control of Porous Properties during Polymerization, Chem. Matter., 1996, pp. 744-750; vol. 8, American Chemical Society.

Xie, S., Preparation of Porous Hydrophilic Monoliths: Effect of the Polymerizaion Conditions on the Porous Properties of Poly (acrylaminde-co-$N,N'$-methylenebisacrylamide), Department of Chemistry, University of California, 1997, pp. 1013-1021, John Wiley & Sons, Inc.

Zou, H. et al., Monolithic stationary phases for liquid chromatography and capillary electrochromatography, Journal of Chromatography A, 2002, pp. 5-32, vol. 954, Elsevier Science B.V.

* cited by examiner

MONOLITHIC ORGANIC COPOLYMER

FIELD OF THE INVENTION

The present invention relates to monolithic organic copolymers prepared by thermally or photochemically initiated copolymerization of styrene or (meth)acrylate building blocks in the presence of a porogen, as well as to a method for the preparation thereof. The invention further relates to a method for separating biomolecules and small molecules employing high-performance liquid chromatography (HPLC).

BACKGROUND OF THE INVENTION

HPLC column technology these days is to a great extent inspired by monoliths [1-4]. Monoliths which are also called continuous polymer beds, continuous polymer rods or continuous column supports can be described as a single piece of porous polymer [5]. They have been shown to smooth out some significant limitations of microparticulate columns, mainly in terms of hydrodynamic properties [6] and separation efficiency towards biomolecules due to convective flow [7].

During the last 15 years, HPLC column fabrication based on monolithic materials has gained considerable attention. Inorganic (silica) monolithic polymer networks have been prepared by sol-gel process using silane-precursors starting in 1996 [8,9] and are nowadays commercially available in conventional HPLC as well as in capillary size format (Chromolith™, Merck, Darmstadt, Germany) [10]. Their silica skeleton is characterized by a bimodal pore-size distribution of gigapores or through pores (~2 μm), enabling high flow at moderate back pressure, and mesopores (~15 μm) providing high surface area [11]. This distribution of porosity offers improved resolution and speed of separation regarding small molecules. The analysis of biopolymers (especially biomolecules of high molecular size like proteins or dsDNA fragments), however, is limited due to insufficient presence of macropores [4].

The area of monoliths based upon polymerization of organic monomers can be divided into (meth)acrylate and styrene chemistry [12].

A great diversity of acrylates and methacrylates was employed for monolith fabrication. Next to thermally and chemically [13], also photochemically initiated free radical polymerization of UV-transparent monomers has proven to be suitable for HPLC column design [14]. A number of functional monomers has successfully been copolymerized for various applications; among them the immobilisation of biological compounds [15]. Even if (meth)acrylate monoliths were show to possess high efficiency towards particular biomolecules [14,16,17], it has never been shown that one particular polymer system is capable for high-resolution separation of the whole spectrum of biopolymers covering proteins, peptides, oligonucleotides as well as dsDNA, Nevertheless, it has to be noted that recently some attempts have been made for optimization of (meth)acrylate based monoliths for the separation of small molecules [18,19].

Styrene monoliths, mainly based upon copolymerization of styrene and divinylbenzene (PS/DVB), were finally shown to enable separation of the whole spectrum of biopolymers with unmatched resolution so far [20,21]. Those monoliths were commercialized by LC-Packings (Sunnyvale, Calif., USA). Styrene monoliths, however, seem to be inapplicable for the separation of small molecules, since no publication can be found on this topic.

The fact that the separation of small molecules on organic monoliths still is in its infancy [23] may be explained by the parameters presently employed for control of the porous properties of the polymer networks. The porogen composition [24], polymerization temperature [25] or initiator content [26] influence the distribution of macropores and thus the separation of analytes of high molecular weight (e.g. biomolecules) only. The possibility to control the fraction of mesopores, whose distribution is important for successful resolution of small molecules, is therefore conditional and insufficient.

OBJECT OF THE INVENTION

It is therefore the object of the present invention to overcome the drawbacks and problems of the prior art and to provide monolithic organic copolymers which are suitable for biopolymer chromatography as well as for chromatography of small molecules.

DETAILED DESCRIPTION

Figure 1:
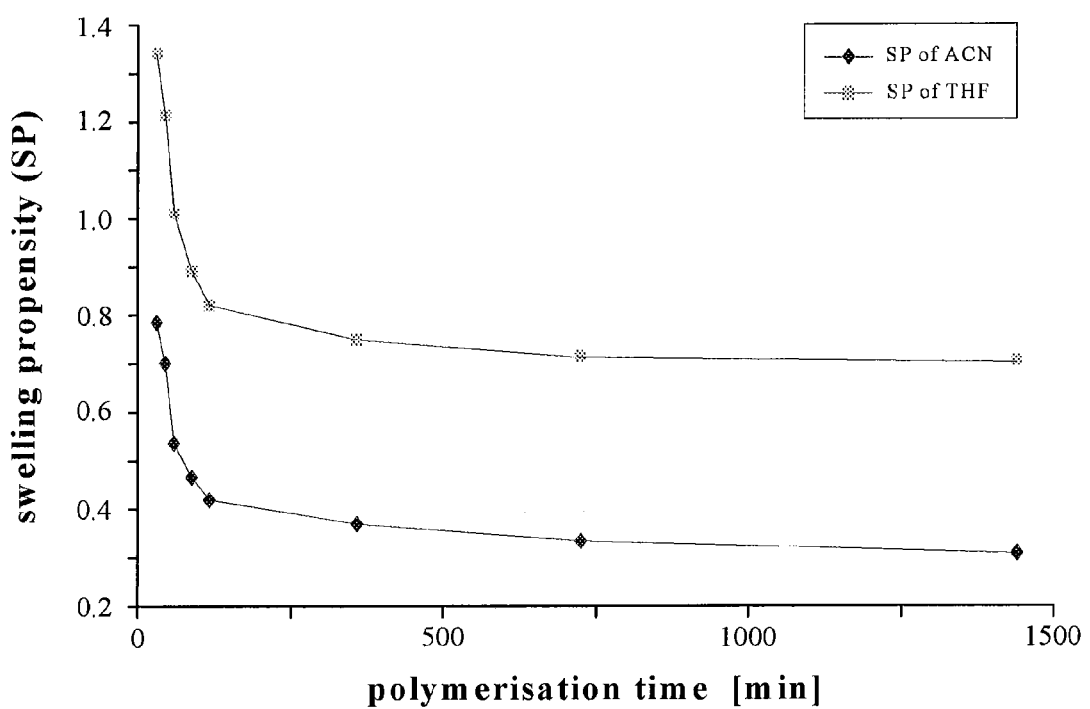
FIG. 1 is a graph showing a plot of swelling propensity (SP) (calculated for ACN and THF) against polymerization time.

This and further objects which will become apparent from following specification, which have been achieved by a novel monolithic organic copolymer prepared by copolymerization of at least one monomer of the group consisting of styrene, $(C_1-C_3)$alkylstyrene, (meth)acrylic acid and esters thereof, with a crosslinker in the presence of a macroporogen and a microporogen, wherein a) the sum of said at least one monomer of the group and the crosslinker is 10-20%, preferably 10-15%, by volume of the reaction mixture, with the rest being essentially macroporogen and microporogen, and the degree of said copolymerization is at least 70%, preferably at least 90%, more preferably at least 99%, or b) the sum of said at least one monomer of the group and the crosslinker is 30-50%, preferably 35-45%, by volume of the reaction mixture, with the rest being essentially macroporogen and microporogen, and the degree of said copolymerization is in the range of 25-60%, preferably 35-50%.

For the purposes of the present invention, the degree of copolymerization (P) is defined as follows:

% $P=(1-Z_1/Z_0)\times 100$ $Z_1=x_1+y_1$, wherein $x_1$, is the amount of unreacted monomer at a given stage of polymerization in moles, $y_1$ is the amount of unreacted crosslinker at a given stage of polymerization in moles, and $Z_0=x_0+y_0$, wherein $x_0$ is the amount of monomer before initiation of the polymerization in moles, $y_0$ is the amount of crosslinker before initiation of the polymerization in moles.

According to a preferred embodiment, the crosslinker is selected from the group consisting of divinylbenzene, bis (vinylphenyl)($C_1$-$C_4$)alkane, bis(vinylphenyl($C_1$-$C_2$)alkyl) benzene and diesters formed by reacting (meth)acrylic acid with diols or hydroquinone.

Numerous macroporogens can be employed in the present invention. Suitable macroporogens are, but are not limited to, ($C_1$-$C_{12}$)alcohols, ($C_2$-$C_4$)alkyldiols, cyclopentanol and cyclohexanol.

Similarly, numerous microporogens may be employed in the present invention Non-limiting examples for microporogens are THF, benzene, ($C_1$-$C_{14}$)alkylbenzene and polyalkylated benzenes, ($C_2$-$C_{10}$)alkane, carbon tetrachloride, trichloromethane, dichloromethane, dimethylformamide and formamide.

According to another aspect, the invention provides a method for separating small molecules using high-performance liquid chromatography, wherein as a stationary phase a monolithic organic polymer according to the present invention is used.

The invention is further directed to a method for preparing a monolithic organic copolymer, comprising reacting at least one monomer of the group consisting of styrene, ($C_1$-$C_3$) alkylstyrene, (meth)acrylic acid and esters thereof, with a crosslinker in the presence of a macroporogen and a microporogen, a) wherein the sum of said at least one monomer of the group and the crosslinker is 10-20%, preferably 10-15%, by volume of the reaction mixture, with the rest being essentially macroporogen and microporogen, and continuing the reaction until a degree of said copolymerization of at least 70%, preferably at least 90%, more preferably at least 99%, is obtained, or b) wherein the sum of said at least one monomer of the group and the crosslinker is 30-50%, preferably 35-45%, by volume of the reaction mixture, with the rest being essentially macroporogen and microporogen, and continuing the reaction until a degree of said copolymerization in the range of 25-60%, preferably 35-50%, is obtained.

Furthermore the present invention is directed to said monolithic organic copolymer in the form of particles having a diameter in the range of 2-50 μm. These particles can be prepared by methods well known in the art, e.g. by bulk polymerisation followed by grinding and sieving; by suspension polymerisation and by precipitation polymerisation.

In addition to that the present invention is also directed to said monolithic organic copolymer in the form of a layer having a thickness in the range of 20-400 μm. Such a layer can be prepared by bulk polymerisation between two flat plates.

The invention will be illustrated hereafter in further detail by way of the following examples.

EXAMPLES

Example 1

The fused silica capillary (200 μm ID) is pretreated by etching the inner wall surface with 1 M NaOH at 100° C. After washings steps with water and acetone and drying with nitrogen, the capillary is silanized with 3-(trimethoxysilyl)propyl acrylate in the presence of 2,2-diphenyl-1-picryl-hydrazyl (DPPH) at 120° C. Finally the capillary is flushed with dimethylformamide (DMF), acetone and $CH_2Cl_2$ and dried under a stream of nitrogen. 5 mg α,α'-azoisobutyronitrile (AIBN) and 87.3 mg 1,2-bis(vinylphenyl)ethane (BVPE) are weighed out into a glass vial. 97.5 μl methylstyrene (MS), 255 μl 1-decanol and 50 μl toluene are added, the vial sealed and the mixture dissolved in a sonication bath at 45° C. until a clear solution is reached [27]. This solution is filled into a preheated, silanized fused silica capillary, using a warmed syringe. The polymerization mixture is allowed to proceed for different times (30 min, 45 min, 60 min, 90 min, 2 h, 6 h, 12 h and 24 h) in a water bath at 65° C. under gentle shaking. Monomer conversion was determined to be 30.2% (30 min polymerization), 39.3% (45 min polymerization), 50.9% (60 min polymerization), 64.9% (90 min polymerization), 70.4% (2 h polymerization), 91.6 (6 h polymerization), 98.0% (12 h polymerization), 99.7% (24 h polymerization). Further details upon the conversion of MS and BVPE: see Table 1.

After polymerization, the capillary monolith is immediately purged with acetonitrile for 1 h to remove all porogens and non reacted monomers and finally cut to 8 cm. The capillary is connected to a HPLC pump, being equipped with a degasser and a pulsation damper. For flow-splitting, a T-piece with an integrated restriction capillary is installed between the pump and the monolithic capillary. The outlet of the capillary monolith is connected to 10 cm long fused silica capillary (50 μm ID).

The pump is then subsequently driven with three different solvents (water, tetrahydrofuran (THF) and acetonitrile (ACN)) and the relationship between column backpressure and flow rate is monitored at room temperature. This procedure is performed for all eight columns. The straight lines that resulted from the plot of backpressure against flow rate are then employed for calculation of the swelling propensity (SP) factor [28]

$$SP = \frac{p_{(solvent)} - p_{(H_2O)}}{p_{(H_2O)}} \qquad \text{(Eq. 1)}$$

where p is defined as the ratio of pressure to solvent viscosity.

FIG. 1 presents the plot of SP (calculated for ACN as well as THF) against polymerization time. According to Eq. 1, no swelling occurs if SP=0, the higher the index, the more swelling is observed, whereas a negative value indicates shrinkage of the support. With increasing polymerization time, the swelling of the polymer column (MS/BVPE considered as example) is diminished, as the SP index is exponentially decreasing, Even at low polymerization time (30-45 min) and thus low monomer conversion (30.2-39.2%), swelling of the polymer rod is not exceedingly strong. The SP index for ACN was calculated to be 0.78 for 30 min polymerization and 0.70 for 45 min polymerization. This corroborates that organic monolithic columns prepared by low monomer conversion exhibit good mechanical stability and are thus applicable for HPLC analysis. Further details upon the SP factor for ACN and THF are given in Table 1.

Example 2

The fused silica capillary (200 μm ID) is pretreated by etching the inner wall surface with 1 M NaOH at 100° C. After washings steps with water and acetone and drying with nitrogen, the capillary is silanized with 3-(trimethoxysilyl)propyl acrylate in the presence of 2,2-diphenyl-1-picryl-hydrazyl (DPPH) at 120° C. Finally the capillary is flushed with dimethylformamide (DMF), acetone and $CH_2Cl_2$ and dried under a steam of nitrogen.

5 mg AIBN and 87.3 mg BVPE are weighed out into a glass vial. 97.5 μl MS, 255 μl 1-decanol and 50 μl toluene are added, the vial sealed and the mixture dissolved in a sonication bath at 45° C. until a clear solution is reached. This solution is filled into a preheated, silanized fused silica capillary, using a warmed syringe. The polymerization mixture is allowed to proceed for different times (30 min, 45 min, 60 min, 90 min, 2 h, 6 h, 12 h and 24 h) in a water bath at 65° C. under gentle shaking. Monomer conversion was determined to be 30.2% (30 min polymerization), 39.3% (45 min polymerization), 50.9% (60 min polymerization), 64.9% (90 min polymerization), 70.4% (2 h polymerization), 91.6 (6 h polymerization), 98.0% (12 h polymerization), 99.7% (24 h polymerization). Further details upon the conversion of MS and BVPE: see Table 1.

After polymerization, the capillary monolith is immediately purged with acetonitrile for 1 h to remove all porogens and non reacted monomers and finally cut to 8 cm. The capillary is connected to a HPLC pump, being equipped with a degasser, a pulsation damper and a six-port injection valve (injection volume, 500 nl; implemented by a 75 μm ID fused silica capillary of 11.2 cm length). For flow-splitting, a T-piece with an integrated restriction capillary is installed between the pump and the injection valve. The outlet of the capillary monolith is connected to a bubble cell UV-detector.

An oligodeoxynucleotide standard $[d(pT)_{12-18}]$ is then subsequently injected on all of the eight monolithic columns and separated employing identical ion-pair reversed-phase conditions: solvent A: 0.1 M triethylammonium acetate (TEAA), solvent B: 0.1 M TEAA in 40% ACN, gradient: 10-30% B in 8 min, 7 μl/min, 50° C., UV 254 mm, 2.5 ng total.

Figure 2:
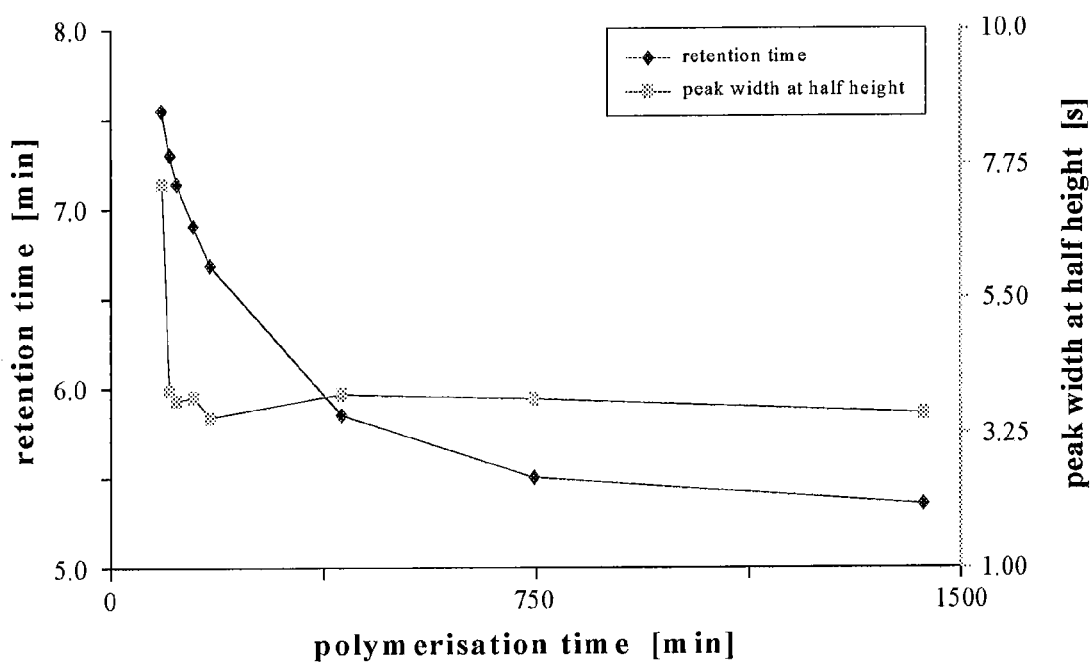
FIG. 2 is a graph showing a plot of retention time and peak width at half peak height against polymerization time.

FIG. 2 presents the plot of important chromatographic parameters (retention time ($t_R$) and peak width at half peak height ($b_{0.5}$)) against polymerization time, where $t_R$ is applied on the primary and $b_{0.5}$ on the secondary axis of abscissa. It can be deduced from FIG. 2 that the retention of oligonucleotides (considered as example for biomolecules) is exponentially decreasing with increasing polymerization time and thus monomer conversion. This suggests that interaction sites and thus surface area is diminished with increasing monomer conversion. Peak sharpness is, however, not influenced by monomer conversion. As a result, reducing monomer conversion does not have an impact on the resolution and separation efficiency of biomolecules, while it strongly enhances the efficiency towards small molecules (see Example 4-8).

Example 3

The fused silica capillary (200 μm ID) is pretreated by etching the inner wall surface with 1 M NaOH at 100° C. After washings steps with water and acetone and drying with nitrogen, the capillary is silanized with 3-(trimethoxysilyl)propyl acrylate in the presence of 2,2-diphenyl-1-picryl-hydrazyl (DPPH) at 120° C. Finally the capillary is flushed with dimethylformamide (DMF), acetone and $CH_2Cl_2$ and dried under a steam of nitrogen.

5 mg AIBN and 87.3 mg BVPE are weighed out into a glass vial. 97.5 μl MS, 255 μl 1-decanol and 50 μl toluene are added, the vial sealed and the mixture dissolved in a sonication bath at 45° C. until a clear solution is reached. This solution is filled into a preheated, silanized fused silica capillary, using a warmed syringe. The polymerization mixture is allowed to proceed for different times (45 min and 24 h) in a water bath at 65° C. under gentle shaking. Monomer conversion was determined to be 39.3% (45 min polymerization), 99.7% (24 h polymerization). Further details upon the conversion of MS and BVPE: see Table 1.

After polymerization, the capillary monolith is immediately purged with acetonitrile for 1 h to remove all porogens and non reacted monomers and finally cut to 8 cm. The capillary is connected to a HPLC pump, being equipped with a degasser, a pulsation damper and a six-port injection valve (injection volume: 500 nl; implemented by a 75 μm ID fused silica capillary of 11.2 cm length). For flow-splitting, a T-piece with an integrated restriction capillary is installed between the pump and the injection valve. The outlet of the capillary monolith is connected to a bubble cell UV-detector.

One oligodeoxynucleotide $[d(pT)_{16}]$ is then subsequently injected onto the monolithic column at different concentrations (38, 76, 150, 300, 600, 1,200 2,400, 4,800 and 9,600 fmol/μl) and separated employing ion-pair reversed-phase conditions; solvent A 0.1 M TEAA, solvent B: 0.1 M TEAA in 40% ACN, gradient: 10-30% B in 8 min, 7 μl/min, 50° C., UV 254 nm. This procedure is repeated for the second monolithic column.

Figure 3:
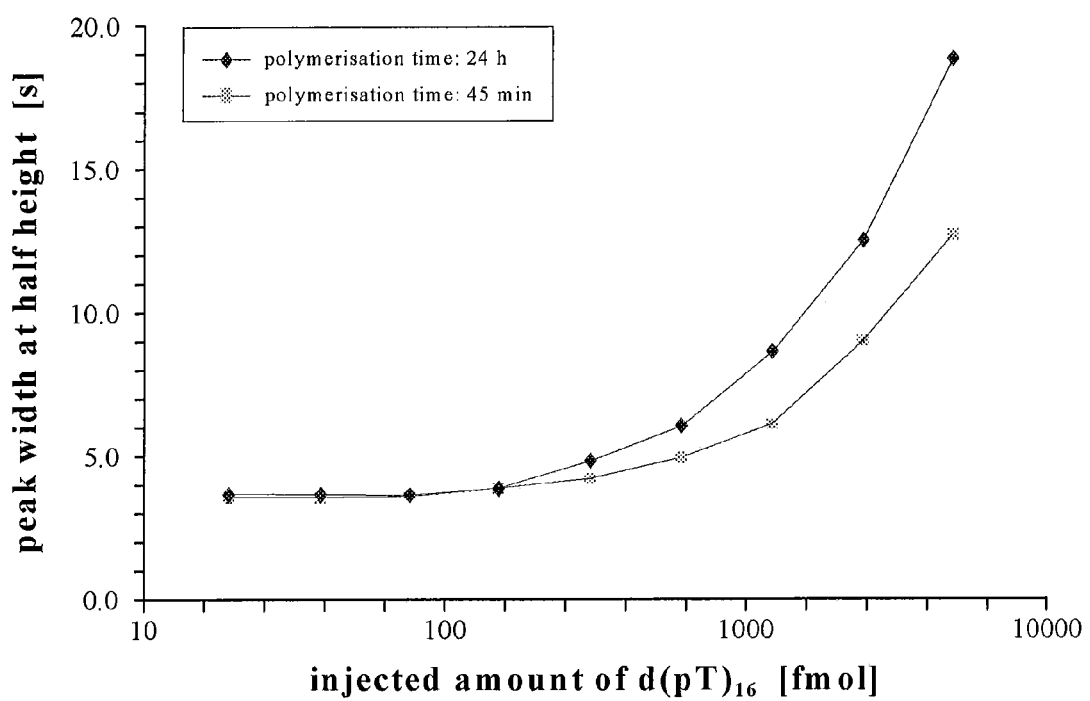
FIG. 3 is a graph showing a plot of peak width at half peak height against injected amount of $d(pT)_{16}$.

FIG. 3 presents the peak width at half peak height ($b_{0.5}$) plotted against the injected amount of $d(pT)_{16}$ for both investigated columns. These capacity curves corroborate that the polymerization time and thus monomer conversion is strongly influencing the capacity and specific surface area of the support. Decreasing monomer conversion is increasing the capacity of the monolithic columns regarding biomolecules.

Example 4

The fused silica capillary (200 μm ID) is pretreated by etching the inner wall surface with 1 M NaOH at 100° C. After washings steps with water and acetone and drying with nitrogen, the capillary is silanized with 3-(trimethoxysilyl)propyl acrylate in the presence of 2,2-diphenyl-1-picryl-hydrazyl (DPPH) at 120° C. Finally the capillary is flushed with dimethylformamide (DMF), acetone and $CH_2Cl_2$ and dried under a steam of nitrogen, 5 mg AIBN and 87.3 mg BVPE are weighed out into a glass vial. 97.5 μl MS, 255 μl 1-decanol and 50 μl toluene are added, the vial sealed and the mixture dissolved in a sonication bath at 45° C. until a clear solution is reached. This solution is filled into a preheated, silanized fused silica capillary, using a warmed syringe. The polymerization mixture is allowed to proceed for different times (45 min-24 h) in a water bath at 65° C. under gentle shaking: (A): 45 min, (B); 60 min, (C): 2 h, (D): 6 h, (E): 12 h, (F): 24 h. Monomer conversion was determined to be 39.3% (A), 50.9% (B), 70.4% (C), 91.6 (D), 98.0% (E), 99.7% (F).

After polymerization, the capillary monolith is immediately purged with acetonitrile for 1 h to remove all porogens and non reacted monomers and finally cut to 8 cm. The capillary is connected to a HPLC pump, being equipped with a degasser, a pulsation damper and a six-port injection valve (injection volume: 500 nl; implemented by a 75 μm ID fused silica capillary of 11.2 cm length). For flow-splitting, a T-piece with an integrated restriction capillary is installed between the pump and the injection valve. The outlet of the capillary monolith is connected to a bubble cell UV-detector.

A mixture of 5 phenols (phenol, 4-nitrophenol, 2-chlorophenol, 2,4-dimethylphenol and 2-nitrophenol; order of elution) is subsequently injected on all of the six monolithic columns and separated employing identical reversed phase conditions: solvent A: 0.1% trifluoroacetic acid (TFA), solvent B: 0.1% TEA in ACN, gradient: 0-50% B in 5 min, 10 µl/min, 50° C., UV 254 nm 10 ng each phenol.

Figure 4:
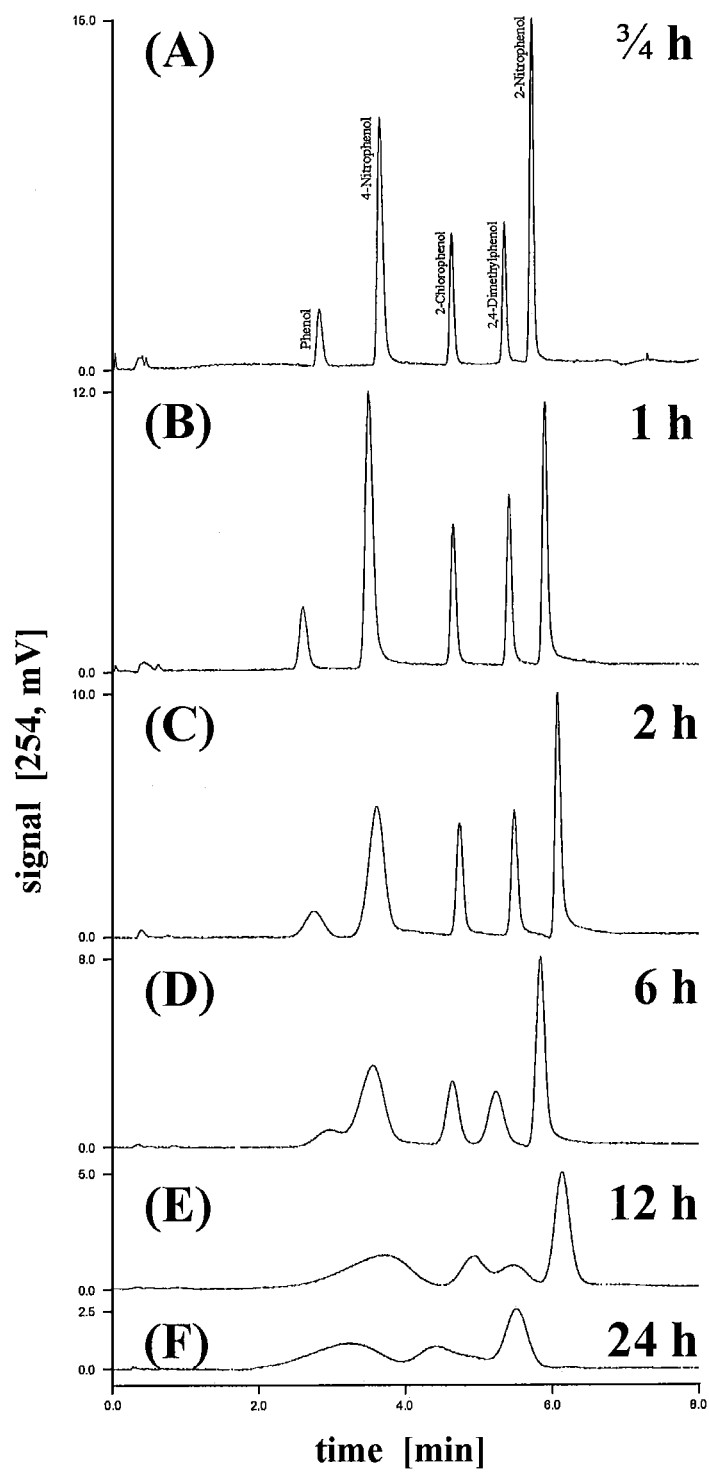
FIG. 4 is a graph illustrating the impact of polymerization time on efficacy of organic monolithic columns relative to separation of small molecules.

FIG. 4 presents the impact of the polymerization time on the efficiency of organic monolithic columns regarding the separation of small molecules considering the MS/BVPE polymer system as example. With decreasing polymerization time, the efficiency and resolution is tremendously improved. This can be ascribed to a broad pore-size distribution, which is build at early stages of the polymerization and Thus low monomer conversion (35-60%). A comparable pore-size distribution has not been reported yet for organic monoliths being prepared by long polymerization times (24 h) and thus complete monomer conversion (>99%).

Example 5

The fused silica capillary (200 µm ID) is pretreated by etching the inner wall surface with 1 M NaOH at 100° C. After washings steps with water and acetone and drying with nitrogen, the capillary is silanized with 3-(trimethoxysilyl)propyl acrylate in the presence of 2,2-diphenyl-1-picryl-hydrazyl (DPPH) at 120° C. Finally the capillary is flushed with dimethylformamide (DMF), acetone and $CH_2Cl_2$ and drying under a steam of nitrogen.

5 mg AIBN and 87.3 mg BVPE are weighed out into a glass vial. 97.5 µl MS, 255 µl 1-decanol and 50 µl toluene are added, the vial sealed and the mixture dissolved in a sonication bath at 45° C. until a clear solution is reached. This solution is filled into a preheated, silanized fused silica capillary, using a warmed syringe. The polymerization mixture is allowed to proceed for 45 min in a water bath at 65° C. under gentle shaking. Monomer conversion was determined to be 39.3%.

After polymerization, the capillary monolith is immediately purged with acetonitrile for 1 h to remove all porogens and non reacted monomers and finally cut to 3 cm. The capillary is connected to a HPLC pump, being equipped with a degasser, a pulsation damper and a six-port injection valve (injection volume: 500 nl; implemented by a 75 µm ID fused silica capillary of 11.2 cm length). For flow-splitting, a T-piece with an integrated restriction capillary is installed between the pump and the injection valve. The outlet of the capillary monolith is connected to a bubble cell UV-detector.

A mixture of 5 styrenes (4-vinylbenzyl alcohol, styrene, p-methylstyrene, 4-bromostyrene and 1,2-bis(p-vinylphenyl) ethane; order of elution) is injected onto the monolithic column and separated employing reversed phase conditions: solvent A: $H_2O$, solvent B: ACN, gradient: 0-100% B in 10 min, 7 µl/min, RT, UV 254 µm, 0.5 ng each styrene.

Figure 5:
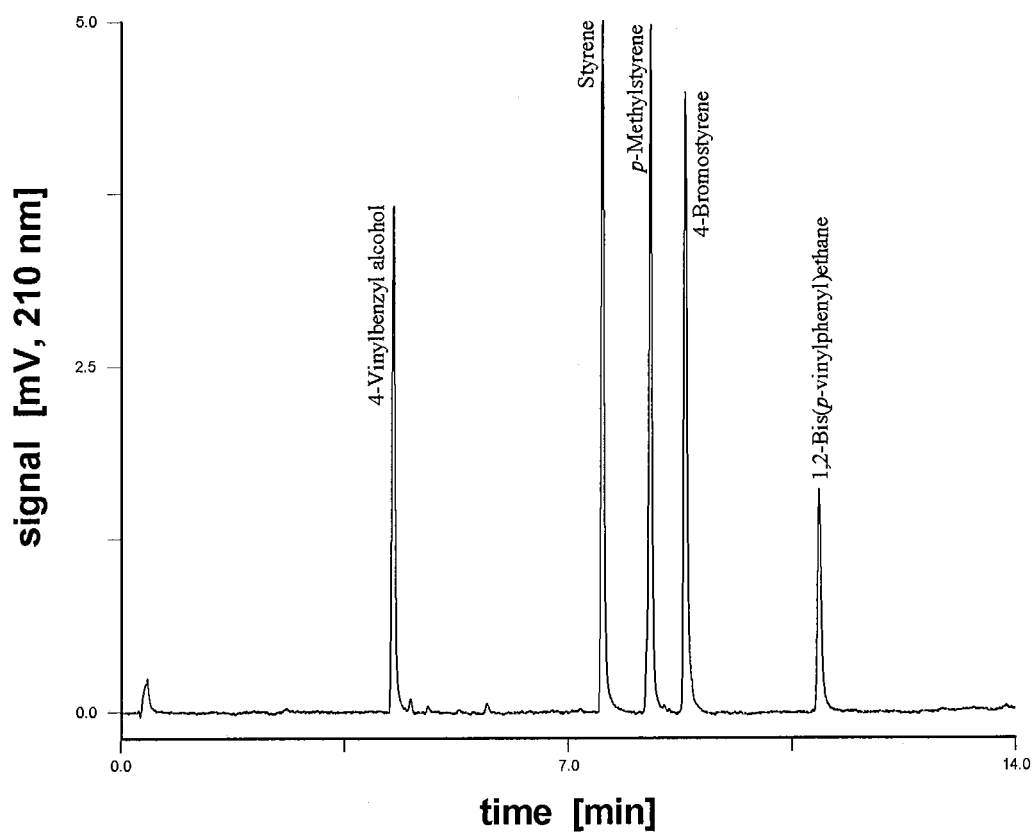
FIG. 5 is a graph illustrating the efficacy of organic monolithic columns with low monomer conversion relative to separation of small, hydrophobic molecules.

FIG. 5 demonstrates the efficiency of organic monolithic columns with low monomer conversion (39.3% in this case) regarding the separation of small, hydrophobic molecules (styrenes) considering the MS/BVPE polymer system as example. The 5 analytes are baseline separated and the resulting peaks show high symmetry. Peak half widths at half peak height ($b_{0.5}$) are remarkably low (3.1-4.0 see).

Example 6

The fused silica capillary (200 µm ID) is pretreated by etching the inner wall surface with 1M NaOH at 100° C. After washings steps with water and acetone and drying with nitrogen, the capillary is silanized with 3-(trimethoxysilyl)propyl acrylate in the presence of 2,2-diphenyl-1-picryl-hydrazyl (DPPH) at 120° C. Finally the capillary is flushed with dimethylformamide (DMF), acetone and $CH_2Cl_2$ and drying under a steam of nitrogen.

5 mg AIBN and 87.3 mg BVPE are weighed out into a glass vial. 97.5 µl MS, 255 µl 1-decanol and 50 µl toluene are added, the vial sealed and the mixture dissolved in a sonication bath at 45° C. until a clear solution is reached. This solution is filled into a preheated, silanized fused silica capillary, using a warmed syringe. The polymerization mixture is allowed to proceed for 45 min in a water bath at 65° C. under gentle shaking. Monomer conversion was determined to be 39.3%.

After polymerization, the capillary monolith is immediately purged with acetonitrile for 1 h to remove all porogens and non reacted monomers and finally cut to 8 cm. The capillary is connected to a HPLC pump, being equipped with a degasser, a pulsation damper and a six-port injection valve (injection volume: 500 nl; implemented by a 75 µm ID fused silica capillary of 11.2 cm length). For flow-splitting, a T-piece with an integrated restriction capillary is installed between the pump and the injection valve. The outlet of the capillary monolith is connected to a bubble cell UV-detector.

A mixture of benzene together with 6 alkylbenzenes (benzene, toluene, ethylbenzene, propylbenzene, butylbenzene, pentylbenzene and hexylbenzene; order of elution) is injected onto the monolithic column and separated employing reversed phase conditions; solvent A: $H_2O$, solvent B: ACN, gradient: 30-100% B in 10 min, 10 µl/min, 50° C., UV 210 nm, 2.5 ng each (alkyl)benzene.

Figure 6:
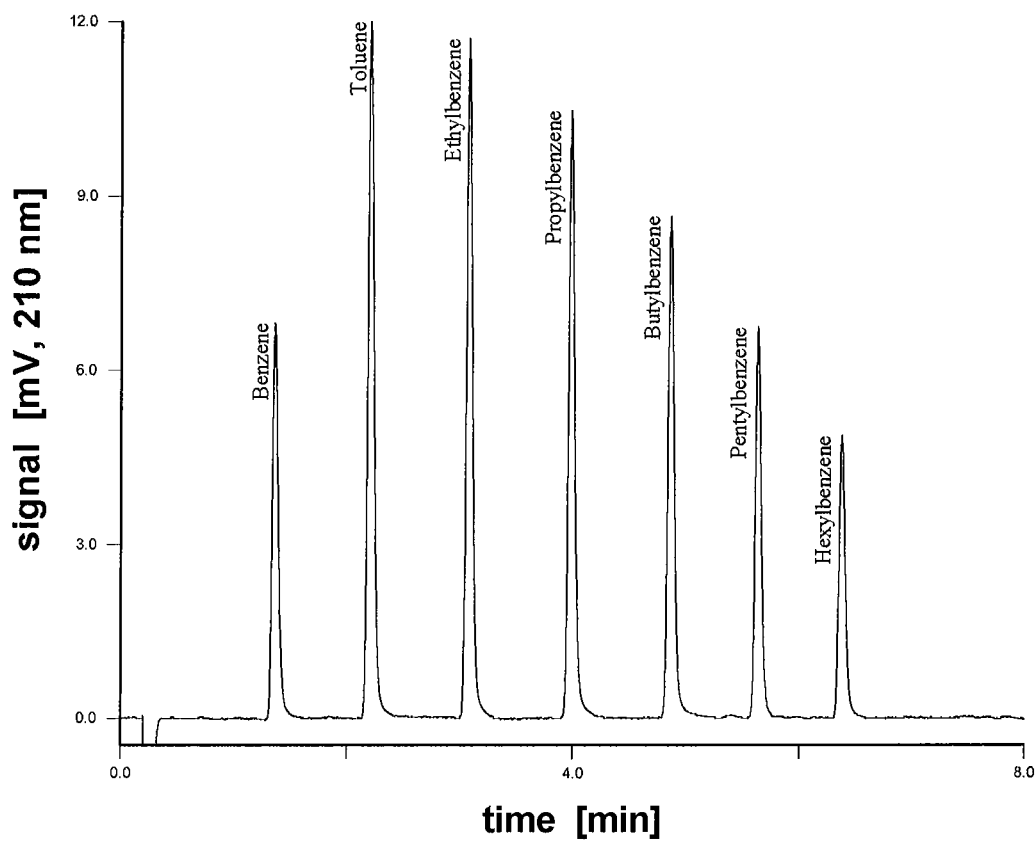
FIG. 6 is a graph illustrating the efficacy of organic monolithic columns with low monomer conversion relative to separation of small, hydrophobic molecules.

FIG. 6 demonstrates the efficiency of organic monolithic columns with low monomer conversion (39.3% in this case) regarding the separation of small, hydrophobic molecules (homologous series of alkylbenzenes) considering the MS/BVPE polymer system as example. The 7 analytes are baseline separated and the resulting peaks show high symmetry. Peak half widths at half peak height ($b_{0.5}$) are remarkably low (3.1-3.7 sec), while resolution (R) was calculated to be between 8.9 and 6.9.

Example 7

The fused silica capillary (200 µm ID) is pretreated by etching the inner wall surface with 1M NaOH at 100° C. After washings steps with water and acetone and drying with nitrogen, the capillary is silanized with 3-(trimethoxysilyl)propyl acrylate in the presence of 2,2-diphenyl-1-picryl-hydrazyl (DPPH) at 120° C. Finally the capillary is flushed with dimethylformamide (DMF), acetone and $CH_2Cl_2$ and drying under a steam of nitrogen.

5 mg AIBN and 87.3 mg BVPE are weighed out into a glass vial. 97.5 µl MS, 255 µl 1-decanol and 50 µl toluene are added, the vial sealed and the mixture dissolved in a sonication bath at 45° C. until a clear solution is reached. This solution is filled into a preheated, silanized fused silica capillary, using a warmed syringe. The polymerization mixture is allowed to proceed for 45 min in a water bath at 65° C. under gentle shaking. Monomer conversion was determined to be 39.3%.

After polymerization, the capillary monolith is immediately purged with acetonitrile for 1 h to remove all porogens and non reacted monomers and finally cut to 8 cm. The capillary is connected to a HPLC pump, being equipped with a degasser, a pulsation damper and a six-port injection valve (injection volume: 500 nl; implemented by a 75 µm ID fused silica capillary of 11.2 cm length). For flow-splitting, a T-piece with an integrated restriction capillary is installed between the pump and the injection valve. The outlet of the capillary monolith is connected to a bubble cell UV-detector.

A mixture of 7 phenones (acetophenone, propiophenone, butyrophenone, valerophenone, hexanophenone, heptanophenone and octanophenone; order of elution) is injected onto the monolithic column and separated employing reversed phase conditions: solvent A: $H_2O$, solvent B: ACN, gradient: 20-100% B in 10 min, 10 µl/min, RT, UV 210 nm, 1.2 ng each phenone.

Figure 7:
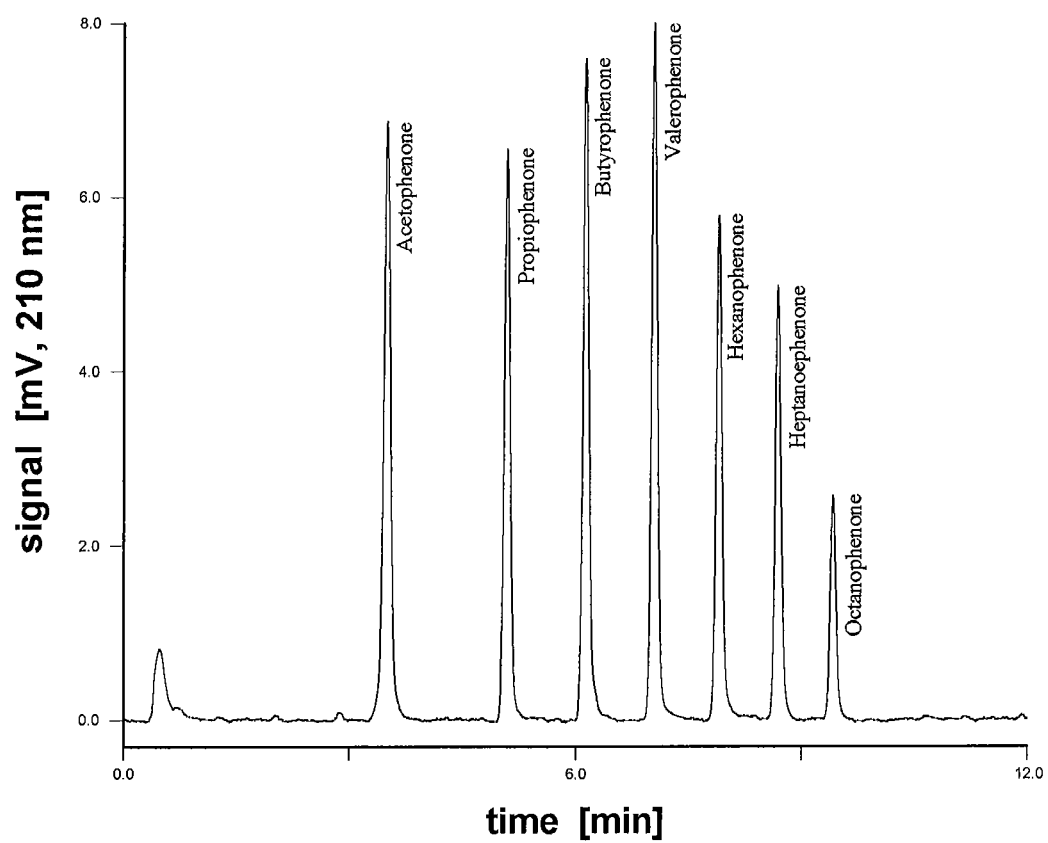
FIG. 7 is a graph illustrating the efficacy of organic monolithic columns with low monomer conversion relative to separation of small, hydrophobic molecules.

FIG. 7 demonstrates the efficiency of organic monolithic columns with low monomer conversion (39.3% in this case) regarding the separation of small, hydrophobic molecules (homologous series of phenones) considering the MS/BVPE polymer system as example. The 5 analytes are baseline separated and the resulting peaks show high symmetry. Peak half widths at half peak height ($b_{0.5}$) are remarkably low (4.9-5.5 sec), while resolution (R) was calculated to be between 9.8 and 4.7.

Example 8

The fused silica capillary (200 µm ID) is pretreated by etching the inner wall surface with 1 M NaOH at 100° C. After washings steps with water and acetone and drying with nitrogen, the capillary is silanized with 3-(trimethoxysilyl)propyl acrylate in the presence of 2,2-diphenyl-1-picryl-hydrazyl (DPPH) at 120° C. Finally the capillary is flushed with dimethylformamide (DMF), acetone and $CH_2Cl_2$ and drying under a steam of nitrogen.

5 mg AIBN and 87.3 mg BVPE are weighed out into a glass vial. 97.5 µl MS, 255 µl 1-decanol and 50 µl toluene are added, the vial sealed and the mixture dissolved in a sonication bath at 45° C. until a clear solution is reached. This solution is filled into a preheated, silanized fused silica capillary, using a warmed syringe. The polymerization mixture is allowed to proceed for 45 min in a water bath at 65° C. under gentle shaking. Monomer conversion was determined to be 39.3%.

After polymerization, the capillary monolith is immediately purged with acetonitrile for 1 h to remove all porogens and non reacted monomers and finally cut to 8 cm. The capillary is connected to a HPLC pump, being equipped with a degasser, a pulsation damper and a six-port injection valve (injection volume, 500 nl; implemented by a 75 µm ID fused silica capillary of 11.2 cm length). For flow-splitting, a T-piece with an integrated restriction capillary is installed between the pump and the injection valve. The outlet of the capillary monolith is connected to a bubble cell UV-detector.

A mixture of benzene together with 5 alkylbenzenes (benzene, toluene, ethylbenzene, propylbenzene, butylbenzene, pentylbenzene; order of elution) is injected onto the monolithic column and separated employing reversed phase conditions in gradient mode (Example 8(A)): solvent A: $H_2O$, solvent B; ACN, gradient: 30-100% B in 10 min, 6 µl/min, RT, UV 210 nm, 2.5 ng each (alkyl)benzene. Afterwards the same mixture was injected onto the same monolithic column and separated employing reversed phase conditions in isocratic mode (Example 8(B)): solvent A: $H_2O$, solvent B: ACN, isocratic: 60% B, 6 µl/min, RT, UV 210 nm, 2.5 ng each (alkyl)benzene.

Figure 8:
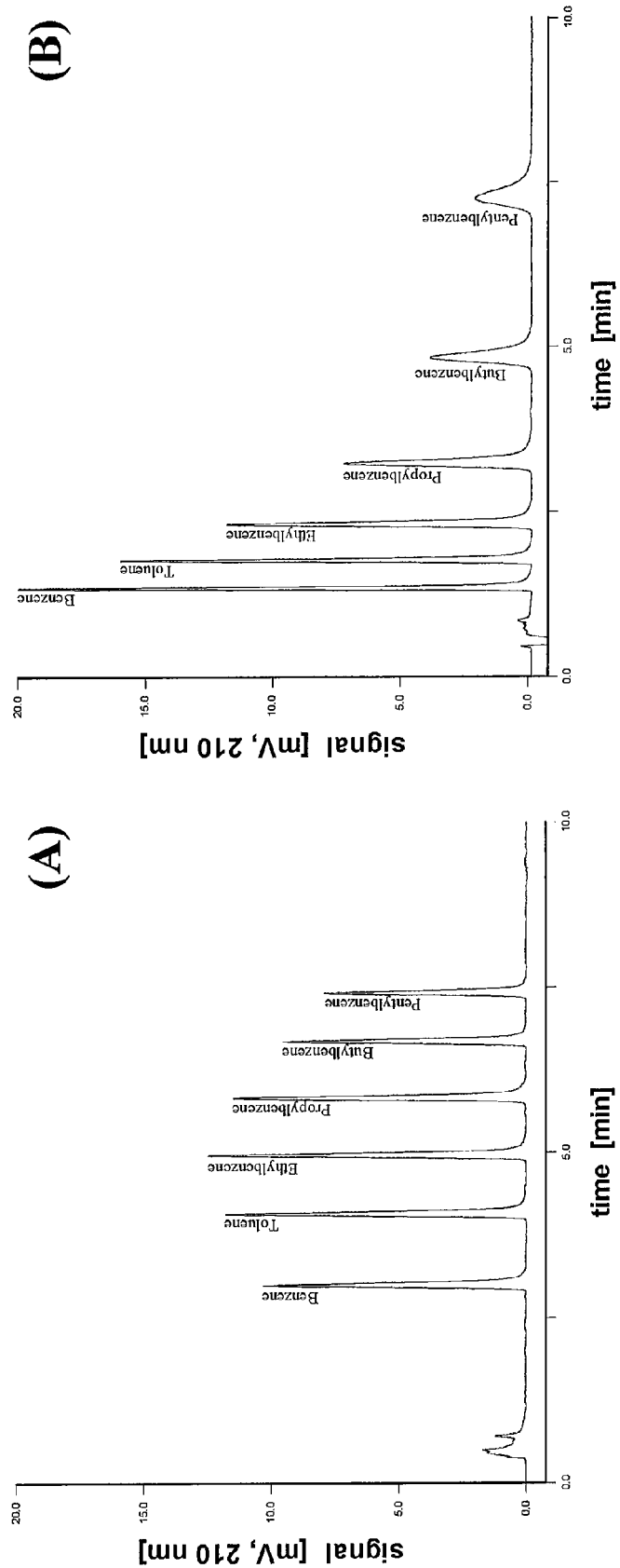
FIG. 8 includes graphs (A) and (B) illustrating separation of small molecules on organic monolithic columns.

FIG. 8(A) demonstrates that the separation of small molecules on the organic monolithic columns (monolithic MS/BVPE considered as example) built by low monomer conversion (39.3% in this case) is enabled under both, gradient and isocratic conditions. FIG. 8(B) allows the estimation of chromatographic parameters like plate height (H) and number of theoretical plates (N). The mean value of H was calculated to be around 17 µm, while the mean value of N was found to be 58.000 (per meter), which is comparable to most of the microparticulate columns presently available. A more comprehensive summary of those chromatographic parameters can be found in Table 2.

Example 9

The fused silica capillary (200 µm ID) is pretreated by etching the inner wall surface with M NaOH at 100° C. After washings steps with water and acetone and drying with nitrogen, the capillary is silanized with 3-(trimethoxysilyl)propyl acrylate in the presence of 2,2-diphenyl-1-picryl-hydrazyl (DPPH) at 120° C. Finally the capillary is flushed with dimethylformamide (DMF), acetone and $CH_2Cl_2$ and dried under a steam of nitrogen.

5 mg AIBN and 102.5 µl styrene (S), 102.5 µl divinylbenzene (DVB), 240 µl 1-decanol and 55 µl toluene are mixed in a glass vial. The vial is sealed and the mixture degassed in a sonication bath at RT. This solution is filled into a silanized fused silica capillary, using a syringe. The polymerization mixture is allowed to proceed for different times (60 min-24 h) in a water bath at 65° C. under gentle shaking: Example 9(A): 60 min, Example 9(B); 2 h, Example 9(C): 24 h.

After polymerization, the capillary monolith is immediately purged with acetonitrile for 1 h to remove all porogens and non reacted monomers and finally cut to 8 cm. The capillary is connected to a HPLC pump, being equipped with a degasser, a pulsation damper and a six-port injection valve (injection volume; 500 nl; implemented by a 75 µm ID fused silica capillary of 11.2 cm length). For flow-splitting, a T-piece with an integrated restriction capillary is installed between the pump and the injection valve. The outlet of the capillary monolith is connected to a bubble cell UV-detector, A mixture of benzene together with 6 alkylbenzenes (benzene, toluene, ethylbenzene, propylbenzene, butylbenzene, pentylbenzene and hexylbenzene; order of elution) is subsequently injected onto all of the three monolithic PS/DVB columns and separated employing identical reversed phase conditions: solvent A; $H_2O$, solvent B: ACN, gradient: 30-100% B in 10 min, 10 µl/min, 60° C., UV 210 nm, 2.5 ng each (alkyl)benzene.

Figure 9:
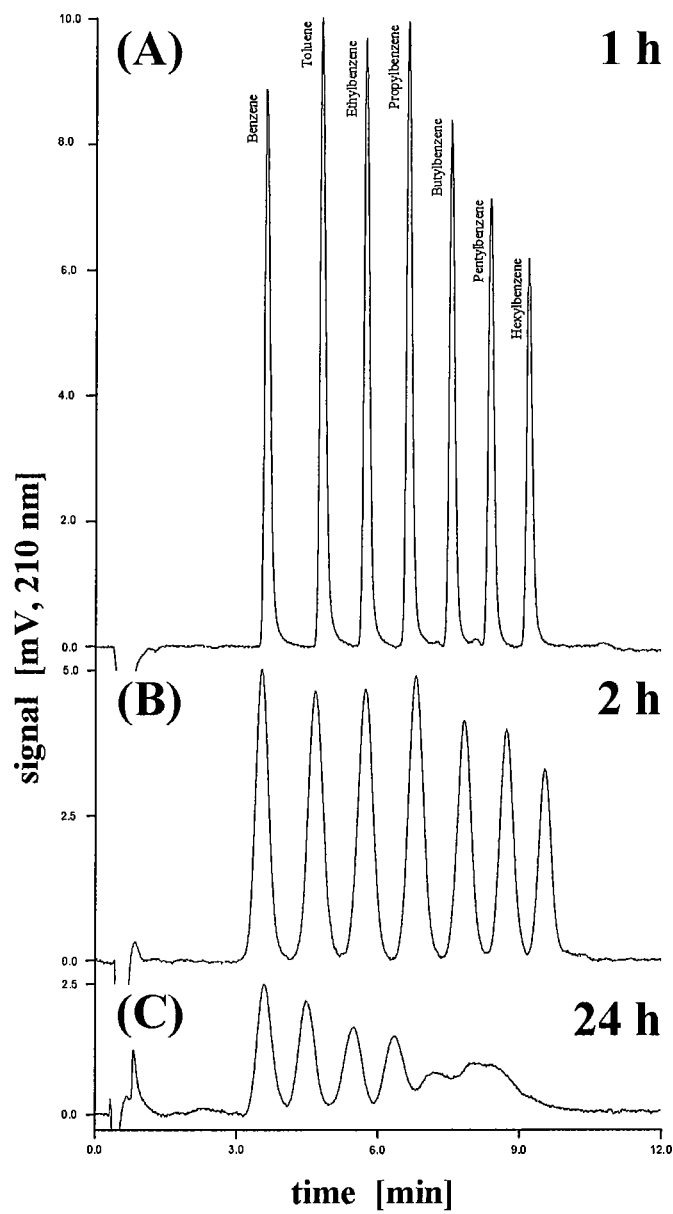
FIG. 9 is a graph illustrating the impact of polymerization time on efficacy of organic monolithic columns relative to separation of small molecules.

FIG. 9 presents the impact of the polymerization time on the efficiency of organic monolithic columns regarding the separation of small molecules considering the PS/DVB polymer system as example. With decreasing polymerization time, efficiency and resolution is tremendously improved. The results can be compared to Example 4, where the impact of the polymerization time on the separation of small molecules on monolithic MS/BVPE is demonstrated. Example 9 proves that the effect of polymerization time and thus monomer conversion on the pore-size distribution can be generalized for (thermally initiated) free radical polymerizations in the presence of porogens.

TABLE 1

| Polymerization time [min] | Conversion | | Mechanical and hydrodynamic properties | | | Porosity data | | |
|---|---|---|---|---|---|---|---|---|
| | Conversion MS [%] | Conversion BVPE [%] | $SP_{(THF)}$ | $SP_{(ACN)}$ | relative Permeability[a] | $\epsilon_T[\%]^{[b]}$ | $\epsilon_Z[\%]^{[c]}$ | $\epsilon_P[\%]^{[d]}$ |
| 30 | 22.08 | 38.46 | 1.34 | 0.78 | 2.56 | — | — | — |
| 45 | 30.77 | 47.67 | 1.21 | 0.70 | 1.66 | 97.12 | 71.39 | 25.73 |
| 60 | 40.82 | 61.06 | 1.01 | 0.54 | 1.39 | 91.12 | 68.18 | 22.94 |
| 90 | 54.43 | 75.54 | 0.88 | 0.46 | 1.27 | 89.03 | 67.49 | 21.54 |
| 120 | 58.95 | 81.83 | 0.82 | 0.41 | 1.21 | 82.21 | 60.99 | 21.22 |
| 360 | 85.37 | 97.75 | 0.75 | 0.37 | 1.10 | 76.55 | 55.61 | 20.94 |
| 720 | 96.52 | 99.37 | 0.71 | 0.33 | 1.02 | 70.2 | 49.76 | 20.44 |
| 1440 = 24 h | 99.54 | 99.91 | 0.70 | 0.31 | 1.00 | 62.81 | 42.62 | 20.19 |

TABLE 2

| Retention time [min] | Peak half width [sec] | Peak half width [min] | Plate height [µm] | Number of plates/column | Number of plates/meter |
|---|---|---|---|---|---|
| 1.342 | 2.7 | 0.045 | 16.22 | 4932 | 61646 |
| 1.763 | 3.5 | 0.058 | 15.79 | 5065 | 63314 |
| 2.310 | 4.6 | 0.077 | 15.89 | 5034 | 62927 |
| 3.232 | 6.7 | 0.112 | 17.22 | 4645 | 58066 |
| 4.830 | 10.5 | 0.175 | 18.94 | 4224 | 52801 |
| 7.240 | 16.7 | 0.278 | 21.32 | 3752 | 46900 |

REFERENCES

[1] Svec, F. *J. Sep. Sci.* 2004, 27, 747-766.
[2] Svec, F. *J. Sep. Sci.* 2004, 27, 1219-1430.
[3] Klodzińska, E.; Moravcova, D.; Jandera, P.; Buszewski, B. *J. Chromatogr., A* 2006, 1109, 51-59.
[4] Svec, F.; Huber, C. G., *Anal. Chem.* 2006, 78, 2101-2107.
[5] Hjertén, S.; Liao, J. L.; Zhang, R. *J. Chromatogr.* 1989, 473, 273-275.
[6] Viklund, C.; Svec, F.; Fréchet, J. M. J; Irgum, K. *Chem. Mater.* 1996, 8, 744-750.
[7] Podgornik, A.; Štrancar, A. *Biorech. Ann. Rev.* 2005, 11, 281-333.
[8] Minakuchi, H.; Nakanishi, K.; Soga, N.; Ishizuka, N.; Tanaka, N. *Anal. Chem.* 1996, 68, 3498-3501.
[9] Fields, S. M. *Anal. Chem.* 1996, 68, 2709-2712.
[10] Cabrera, K. *J. Sep. Sci.* 2004, 27, 843-852.
[11] Tanaka, N.; Kobayashi, H.; Ishizuka, N.; Minakuchi, H.; Nakanishi, K.; Hosoya, K.; Ikegami, T. *J. Chromatogr., A* 2002, 965, 35-49.
[12] Zau, H.; Huang, X.; Ye, M.; Luo, Q. *J. Chromatogr., A* 2002, 954, 5-32.
[13] Hjertén, S. *Ind. Eng. Chaem. Res.* 1999, 38, 1205-1214.
[14] Lee, D; Svec, F.; Fréchet, J. M. J. *J. Chromatogr., A* 2004, 1051, 53-60.
[15] Peters, E. C.; Svec, F.; Fréchet, J. M. J. *Adv. Mater.* 1999, 11, 1169-1181.
[16] Sykora, D.; Svec, F.; Fréchet, J. M. J. *J. Chromatogr., A* 1999, 852, 297-304.
[17] Benčina, M.; Podgornik, A.; Štrancar, A. *J. Sep. Sci.* 2004, 27, 801-810.
[18] Holdšvendová, P.; Coufal, P.; Suchánkova, J.; Tesařová, E.; Bosáková, Z. *J. Sep. Sci.* 2003, 26, 1623-1623.
[19] Moravcová, P.; Jandera, P.; Urban, J.; Planeta, J. *J. Sep. Sci.* 2003, 26, 1005-1016.
[20] Premstaller, A.; Oberacher, H.; Walcher, W.; Timperio, A. M.; Zolla, L.; Chervet, J. P.; Cavusoglu, N.; van Dorsselaer, A.; Huber, C. G. *Anal. Chem.* 2001, 73, 2390-2396.
[21] Premstaller, A.; Oberacher, H.; Huber, C. G. *Anal. Chem.* 2000, 72, 4386-4393.
[22] Gusev, I.; Huang, X.; Horváth, C., *J. Chromatogr., A* 1999, 855, 273-290.
[23] Peters, E. C., Ericson, C. J. *Chrom. Libr.* 2003, 67, 373-387.
[24] Svec, F.; Peters, E. C.; Sykora, D.; Fréchet, J. M. J. *J. Chromatogr., A* 2000, 887, 3-29.
[25] Svec, F.; Fréchet, J. M. J. *Macromolecules* 1995, 28, 7580-7582.
[26] Xie, S. F.; Svec, F.; Fréchet, J. M. J. *J. Polym. Sci., A* 1997, 35, 1013-1021.
[27] Trojer, L.; Lubbad, S. H.; Bisjak, C. P.; Bonn, G. K. *J. Chromatogr., A* 2006, 1117, 56-66.
[28] Nevejans, F.; Verzele, M. *J. Chromatogr.* 1985, 350, 145-150.

The invention claimed is:

1. A method for preparing a monolithic organic copolymer capable of resolving a mixture of small molecules, the method comprising:
   reacting at least one monomer of the group consisting of styrene, ($C_1$-$C_3$)alkylstyrene, (meth)acrylic acid and esters thereof, with a crosslinker in the presence of a macroporogen and a microporogen, wherein the sum of said at least one monomer of the group and the crosslinker is 10-15% by volume of the reaction mixture, with the rest being essentially macroporogen and microporogen;
   continuing the reaction until a degree of copolymerization of 70% to 90% is obtained; and
   purging the monolithic organic copolymer to remove non-reacted monomers and porogens.

2. The method of claim 1, wherein the crosslinker is selected from the group consisting of divinylbenzene, bis(vinylphenyl)($C_1$-$C_4$)alkane, bis(vinylphenyl($C_1$-$C_2$)alkyl)benzene, and diesters formed by reacting (meth)acrylic acid with diols or hydroquinone.

3. The method of claim 1, wherein the macroporogen is selected from the group consisting of ($C_1$-$C_{12}$)alcohols, ($C_2$-$C_4$) alkyldiols, cyclopentanol, and cyclohexanol.

4. The method of claim 1, wherein the microporogen is selected from the group consisting of THF, benzene, ($C_1$-$C_{14}$) alkylbenzene, polyalkylated benzenes, ($C_2$-$C_{10}$)alkane, carbon tetrachloride, trichloromethane, dichloromethane, dimethylformamide, and formamide.

5. A method for preparing a monolithic organic copolymer capable of resolving small molecules, peptides, and oligonucleotides, the method comprising:
   reacting at least one monomer of the group consisting of styrene, ($C_1$-$C_3$)alkylstyrene, (meth)acrylic acid and esters thereof, with a crosslinker in the presence of a macroporogen and a microporogen, wherein the sum of said at least one monomer of the group and the crosslinker is 10-15% by volume of the reaction mixture, with the rest being essentially macroporogen and microporogen;

continuing the reaction for a period of time until a degree of copolymerization of 70% to 90% is obtained; and purging the monolithic organic copolymer to remove non-reacted monomers and porogens.

6. The method of claim 5, wherein the crosslinker is selected from the group consisting of divinylbenzene, bis(vinylphenyl)($C_1$-$C_4$)alkane, bis(vinylphenyl($C_1$-$C_2$)alkyl)benzene, and diesters formed by reacting (meth)acrylic acid with diols or hydroquinone.

7. The method of claim 5, wherein the macroporogen is selected from the group consisting of ($C_1$-$C_{12}$)alcohols, ($C_2$-$C_4$) alkyldiols, cyclopentanol, and cyclohexanol.

8. The method of claim 5, wherein the microporogen is selected from the group consisting of THF, benzene, ($C_1$-$C_{14}$) alkylbenzene, polyalkylated benzenes, ($C_2$-$C_{10}$)alkane, carbon tetrachloride, trichloromethane, dichloromethane, dimethylformamide, and formamide.

9. A method for preparing a monolithic organic copolymer capable of resolving a mixture of small molecules, the method comprising:

reacting at least one monomer of the group consisting of styrene, ($C_1$-$C_3$)alkylstyrene, (meth)acrylic acid and esters thereof, with a crosslinker in the presence of a macroporogen and a microporogen, wherein the sum of said at least one monomer of the group and the crosslinker is 10-15% by volume of the reaction mixture, with the rest being essentially macroporogen and microporogen;

continuing the reaction until a degree of copolymerization of 70% is obtained; and purging the monolithic organic copolymer to remove non-reacted monomers and porogens.

* * * * *

UNITED STATES PATENT AND TRADEMARK OFFICE
CERTIFICATE OF CORRECTION

PATENT NO. : 8,586,641 B2  
APPLICATION NO. : 11/551181  
DATED : November 19, 2013  
INVENTOR(S) : Trojer et al.

Page 1 of 1

It is certified that error appears in the above-identified patent and that said Letters Patent is hereby corrected as shown below:

In the Specification

Column 1  
Line 52, change "were show" to --were shown--  
Line 56, change "dsDNA, Nevertheless" to --dsDNA. Nevertheless--

Column 3  
Line 7, change "$x_1$, is" to --$x_1$ is--  
Line 27, change "invention Non-limiting" to --invention. Non-limiting--

Column 4  
Line 59, change "decreasing, Even" to --decreasing. Even--

Column 6  
Line 48, change "steam of nitrogen," to --stream of nitrogen.--

Column 7  
Line 17, change "and Thus" to --and thus--  
Line 67, change "see)." to --sec).--

Column 9  
Line 66, change "solvent B;" to --solvent B:--

Column 10  
Line 47, change "UV-detector," to --UV-detector.--  
Line 53, change "solvent A;" to --solvent A:--

Signed and Sealed this  
Eleventh Day of March, 2014

Michelle K. Lee  
*Deputy Director of the United States Patent and Trademark Office*